United States Patent [19]

Kubota et al.

[11] Patent Number: 5,377,330

[45] Date of Patent: Dec. 27, 1994

[54] DOCUMENT EDITING APPARATUS FOR EDITING DOCUMENT DATA AND IMAGE DATA

[75] Inventors: Akio Kubota; Shigeru Matsuoka; Hitoshi Yonenaga, all of Hitachi, Japan

[73] Assignee: Hitachi, Ltd., Tokyo, Japan

[21] Appl. No.: 664,435

[22] Filed: Mar. 4, 1991

Related U.S. Application Data

[63] Continuation of Ser. No. 183,926, Apr. 20, 1988, abandoned.

[30] Foreign Application Priority Data

Apr. 20, 1987 [JP] Japan ................. 62-98062

[51] Int. Cl.$^5$ ............................................. G06F 15/62
[52] U.S. Cl. ..................................... 395/275; 395/148; 395/500; 382/9; 364/920.7; 364/943; 364/943.44; 364/DIG. 2
[58] Field of Search ............... 364/DIG. 1, DIG. 2; 395/144, 145, 146, 147, 154, 106, 117, 275; 358/448, 452, 453; 382/9, 57

[56] References Cited

U.S. PATENT DOCUMENTS

| | | | |
|---|---|---|---|
| 4,516,262 | 5/1985 | Sakurai | 382/18 |
| 4,589,144 | 5/1986 | Namba | 382/61 |
| 4,614,978 | 9/1986 | Doster et al. | 358/263 |
| 4,618,883 | 10/1986 | Sakamoto | 358/78 |
| 4,760,606 | 7/1988 | Lesnick et al. | 382/48 |
| 4,774,592 | 9/1988 | Suzuki et al. | 358/285 |
| 4,783,832 | 11/1988 | Kaneko | 382/41 |
| 4,827,349 | 5/1989 | Ogata et al. | 358/256 |
| 4,862,281 | 8/1989 | Sato et al. | 358/400 |
| 4,897,880 | 1/1990 | Wilber et al. | 382/13 |
| 4,907,283 | 3/1990 | Tanaka et al. | 382/40 |
| 4,933,865 | 6/1990 | Yamamoto et al. | 364/518 |
| 4,944,022 | 7/1990 | Yasujima et al. | 382/14 |
| 5,086,434 | 2/1992 | Abe et al. | 375/7 |

Primary Examiner—Thomas C. Lee
Assistant Examiner—Maria N. von Buhr
Attorney, Agent, or Firm—Antonelli, Terry, Stout & Kraus

[57] ABSTRACT

A document editing apparatus in which image data such as data representing an illustration is converted to total digital image data pertaining to a complete image. The total digital image data is divided into a predetermined number of pieces that each include a predetermined number of dots. The divided digital image data is stored in memory as external character data. The total digital image data is converted into a divided digital character data assembly and registered as a digital character data block in memory. Next, character data representing document data is inputted into the memory. The digital character data block and the character data exist together in memory as coexisting editing data. Since the digital image data exists together with the character data in memory, editing processing of document data including the character data and the digital image data can be carried out at one time during operation processing.

8 Claims, 3 Drawing Sheets

DOCUMENT EDITING APPARATUS FOR EDITING DOCUMENT DATA AND IMAGE DATA

This application is a continuation of application Ser. No. 183,926, filed on Apr. 20, 1988, now abandoned.

BACKGROUND OF THE INVENTION

The present invention relates to a document editing apparatus and, more particularly to a document editing apparatus suitable for editing a document including document data and image data.

The present invention comprises an improved document editing apparatus suitable for editing a document which includes document data comprising an assembly of character data and image data comprising digital image data.

A document having illustrations is a type of document in which document data and image data coexist. In such a document, the document data corresponds to character data and the image data corresponds to the illustrations.

When a document having illustrations is composed using a document editing apparatus such as a word processor or the like as in the conventional document editing apparatus disclosed in Japanese Patent Laid-Open publication No. 117621/1984, the document having illustrations is composed as follows.

Character data is inputted from a character input device such as a keyboard and is edited in a main control unit in the document editing apparatus. Also, image data representing an illustration is inputted from an image data input device, which is connected to the main control unit of the document editing apparatus and is edited by the main control unit as digital image data.

In the above conventional document editing apparatus, the document data and the image data related to the illustration are processed separately. After the editing and the printing of the character data inputted from the character input device, the digital image data inputted from the image data input device is edited and printed.

However, in preparing a document having illustrations using the conventional document editing apparatus, it is impossible to edit the character data and the digital image data at the same time during a single operation process therefore, two editing processes and two printing processes are necessary.

SUMMARY OF THE INVENTION

An object of the present invention is to provide a document editing apparatus wherein editing processing for a document having character data and digital image data can be carried out speedily.

Another object of the present invention is to provide a document editing apparatus wherein an editing operation pertaining to character data and digital image data can be simplified.

A further object of the present invention is to provide a document editing apparatus wherein editing processing pertaining to character data and digital image data can be completed at one time during an operation process.

According to the present invention, a document editing apparatus comprises a character data input device for inputting character data, a main control unit having a control unit and a memory, the control unit for controlling and executing editing of the character data and the memory for storing control and execution results of the editing of the character data, and an image data input device connected to the main control unit so as to convert image data into digital image data.

In the present invention, the document editing apparatus further comprises a divider provided in the main control unit for dividing the digital image data inputted from the image data input device into a predetermined number of dot data dots an integral number of times, and a register provided in the main control for storing the divided digital image data as a digital character data block.

In the present invention, the divided digital image data is treated as external character data. External character data generally indicate a character font composed by the user in the document editing apparatus such as processors or the like.

In the present invention, the divided digital image data is treated as character data in the memory and coexists with the character data which makes up the document data.

According to the present invention, digital image data, such as digital image data representing an illustration is stored together with character data in memory so that editing of document data, including character data, and digital image data can be carried out at one time during operation processing.

DESCRIPTION OF THE INVENTION

An embodiment of a document editing apparatus according to the present invention will be explained with reference to the drawings.

Figure 3:
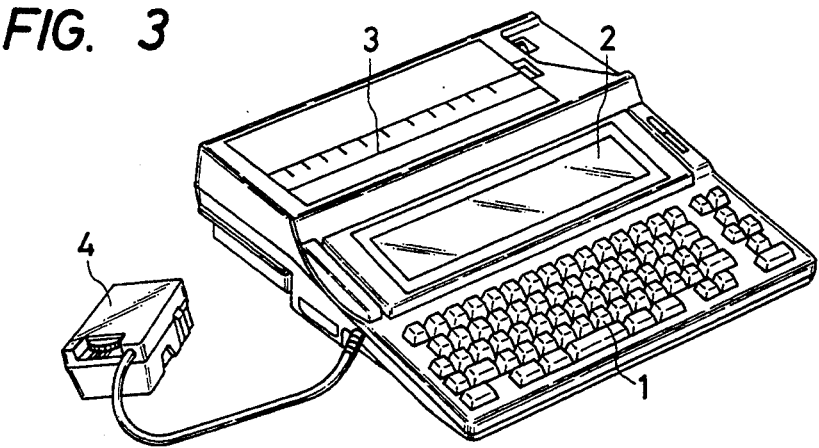
FIG. 3 is a perspective view of a document editing apparatus according to one embodiment of the present invention.

In FIG. 3, a document editing apparatus comprises a keyboard 1 which functions as a character data input device for inputting character data, a liquid crystal (LC) display unit 2 for displaying contents of document data, a printer 3 for printing document edited document data, and an illustration reader head portion 4 for inputting image data as digital image data.

Figure 4:
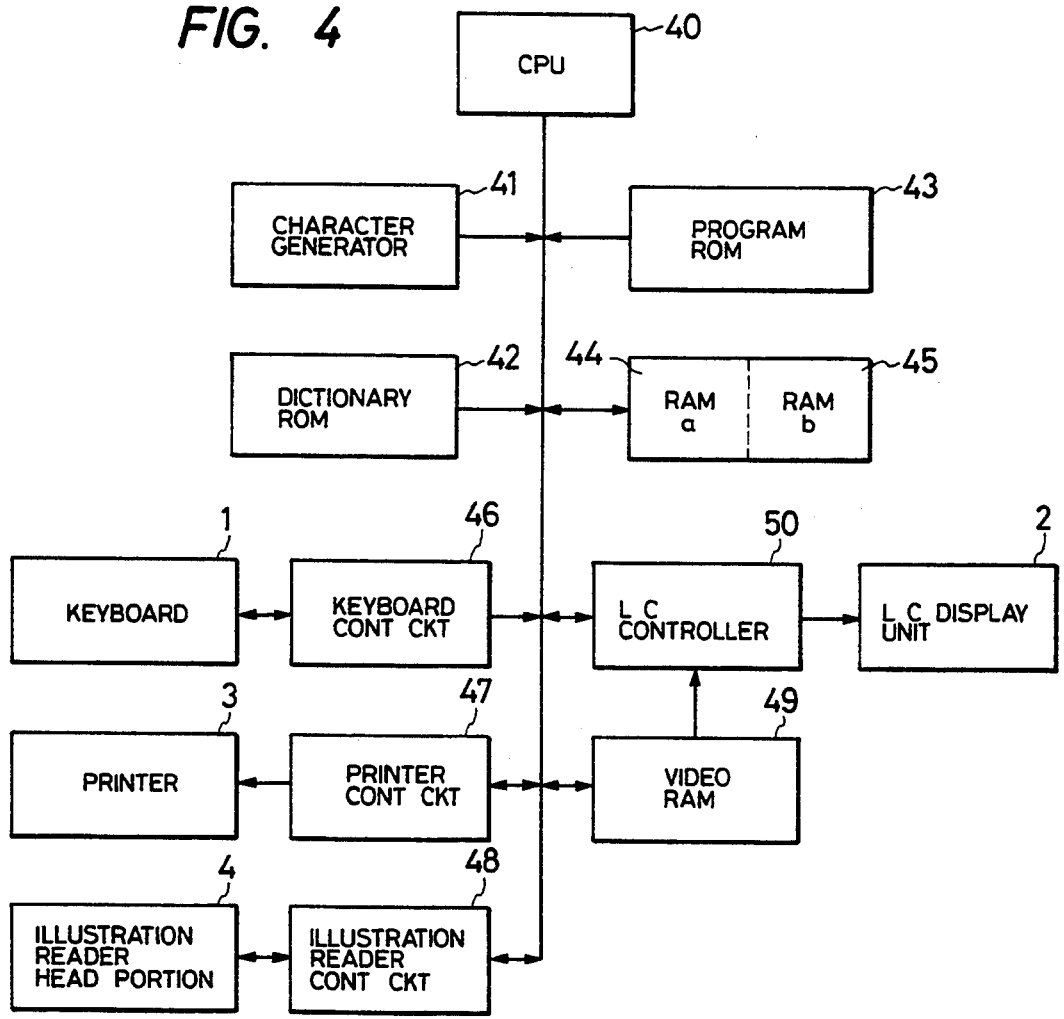
FIG. 4 is an electric control block diagram of the document editing apparatus shown in FIG. 3.

FIG. 4 is an electric control block diagram of the document editing apparatus shown in FIG. 3. In FIG. 4, 40 denotes a CPU (central processing unit), 41 a character generator in which a character font or the like is stored, 42 denotes a dictionary ROM (read only memory) in which a dictionary is stored, 43 denotes a program ROM used in programming for executing functions such as editing in the document editing apparatus, and 44 and 45 denote respectively a random access read/write memory RAMa (random access memory a) and a random access read/write memory RAMb (random access memory b) for storing document information.

In this embodiment of the present invention, a main control unit has a control unit and a memory. The control unit controls and executes functions such as editing of the document data and the digital image data. The memory stores control and execution results of functions such as the editing of the document data and the digital image data. The memory of the main control unit comprises a first memory (the memory RAMa 44) and a second memory (the memory RAMa 45).

In FIG. 4, 46 denotes a keyboard control circuit such as an interface circuit in which a key input of the keyboard 1 can be connected to the CPU 40. 47 denotes a printer control circuit for controlling the motion of the printer 3. 48 denotes an illustration reader control circuit for controlling the illustration reader head portion 4. 49 denotes a video RAM (random access memory) for storing the document data and the digital image data corresponding to each liquid crystal unit dot of the liquid crystal display unit 2 and 50 denotes a liquid crystal controller for driving the liquid crystal unit dots of the liquid crystal display unit 2 in accordance with the content of the video memory RAM 49.

In the above document editing apparatus according to one embodiment of the present invention, after power has been activated, the document editing function is executed through the CPU 40 and the program memory ROM 43.

A key input by the keyboard 1 is converted to an electric signal. The electric signal is inputted by the keyboard control circuit 46. A key code in the keyboard control circuit 46 is delivered and discriminated in the main control unit.

A character font in accordance with the key code is read out from the character generator 41 and stored in the video RAM 49. The content of the video RAM 49 is displayed on the liquid crystal display unit 2 by the liquid crystal controller 50.

The content of the key input may be collated with the dictionary in the dictionary ROM 42, and a corresponding character font is read out from the character generator 41 and stored in the video RAM 49.

When the above operation processing is executed repeatedly, the document data is composed and, such document data is stored in the memory RAMa 44 or the memory RAMb 45.

When printing the edited document data, the document data is converted into printing data by the CPU 40, the program ROM 43, the memory RAMa 44, and the memory RAMb 45 and a drive signal for driving a head of the printer 3 is applied to the printer 3 through the printer electric control circuit 47.

A case in which image data representing an illustration is converted to digital image data and the digital image data is treated as type of character data coexisting with character data related to the document data will be explained in detail in accordance with FIGS. 1 and 2 and with reference to FIGS. 3 and 4.

Figure 1:
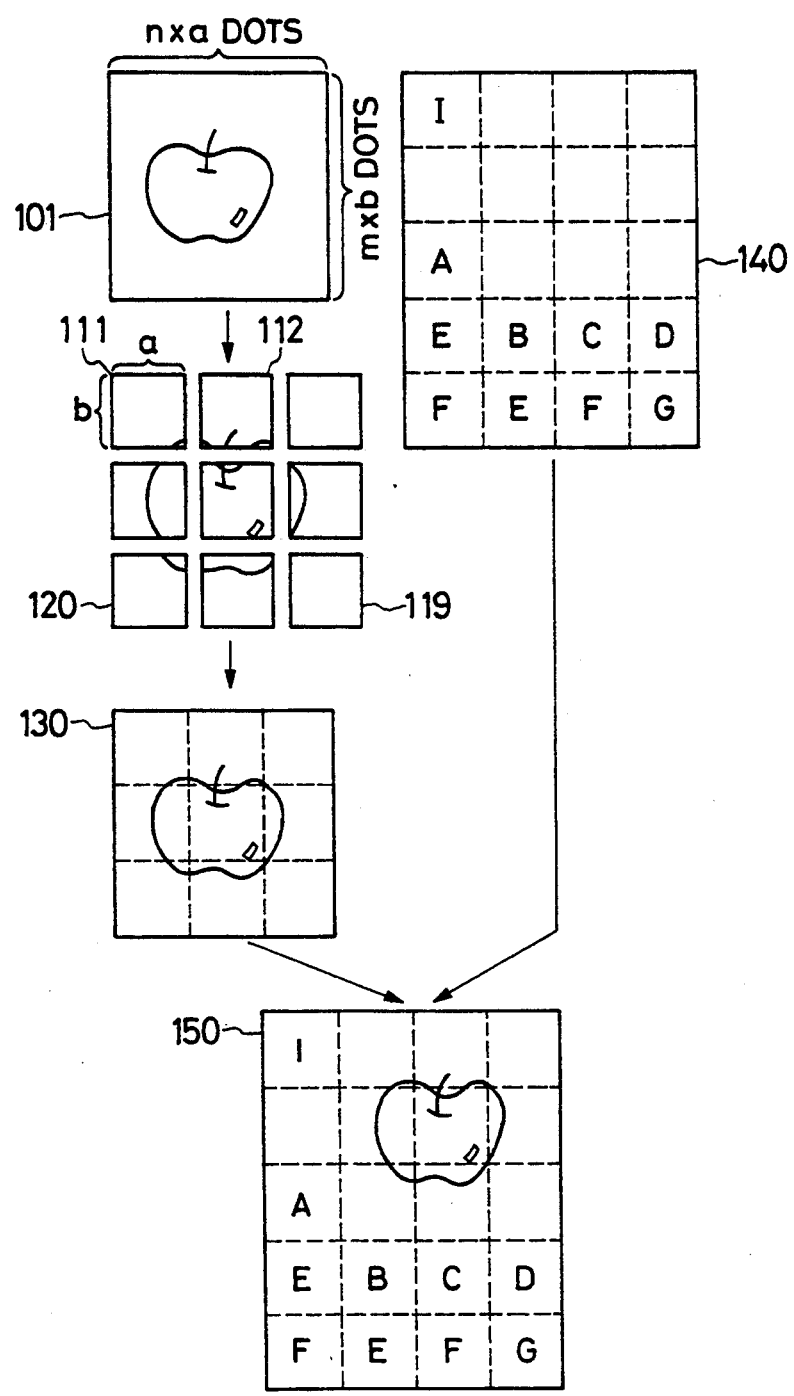
FIG. 1 is a view of a processing system in accordance with one embodiment of the present invention wherein editing of character data and digital image data is carried out at the same time during operation processing.
Figure 2:
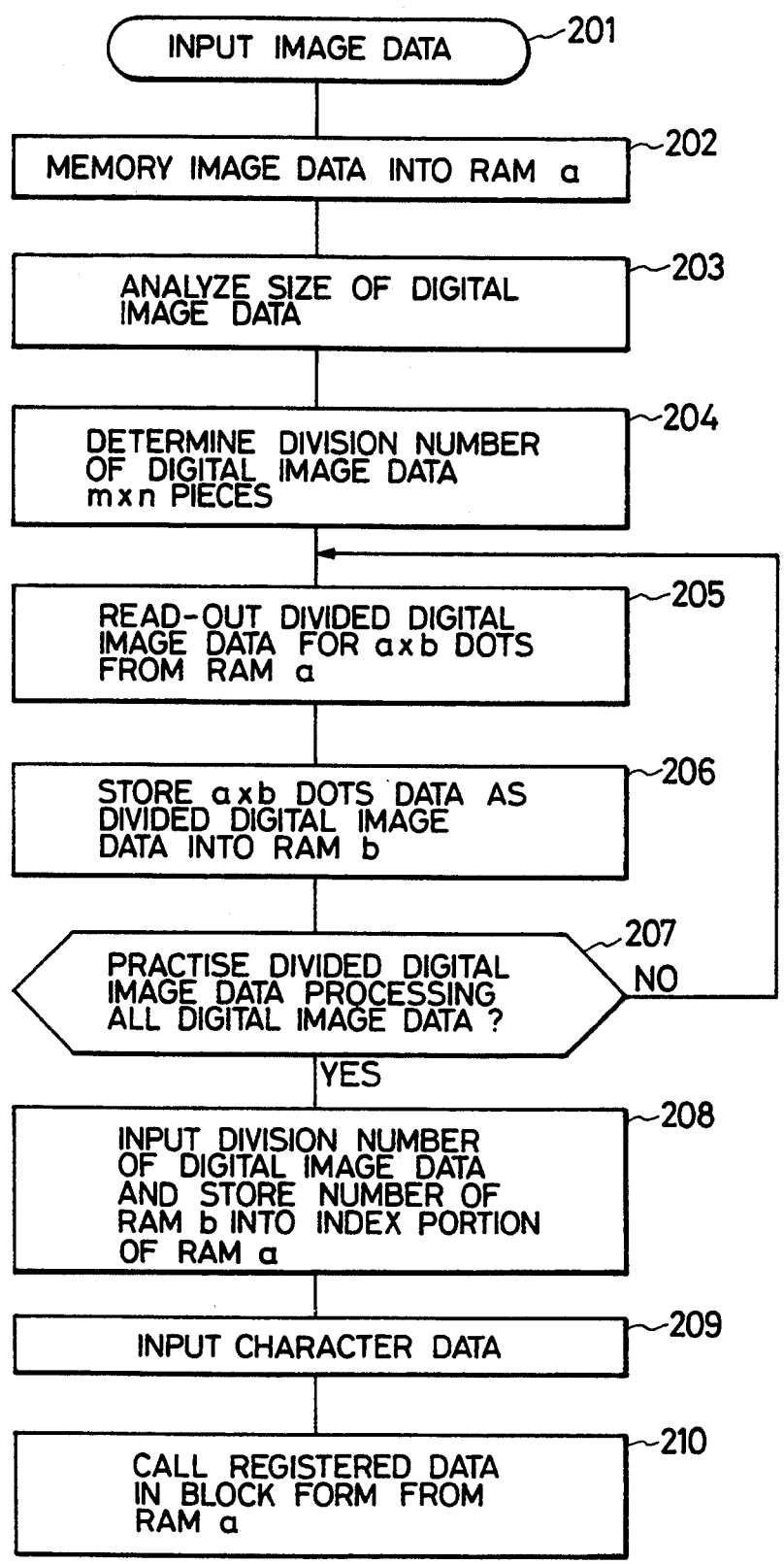
FIG. 2 is a flow chart for indicating the editing processing procedure shown in FIG. 1.

FIG. 1 is a view of an editing processing system in which the character data and the digital image data are edited at the same time during operation processing according to one embodiment of the present invention, and FIG. 2 is a flow chart for indicating the editing processing procedure corresponding to FIG. 1.

Image data such as image data representing an illustration, for example a picture of an apple, is read by the illustration reader head portion 4, which is connected to the main control unit of the document editing apparatus. The image data is converted to total digital image data 101 by the main control unit.

At first, the total digital image data 101 is inputted from the illustration reader head portion 4 (step 201), and stored temporarily in the memory RAMa 44 (step 202). A size or dimension of the total digital image data 101 is analyzed by the CPU 40 (step 203) and the division number of the total digital image data 10i is determined by the CPU 40 (step 204).

In this embodiment of the present invention, for the total digital image data 101, the predetermined dot number to be divided is set to be (a×b) dots, and the total digital image data 101 is divided into (m×n) pieces as shown in FIG. 1. The size of the divided digital image data in the word processor or similar apparatus corresponds generally to the character font. Therefore, it is convenient to set the predetermined dot number to be divided ((a×b) dots) as (16×16) dots, (24×24) dots etc.

In this embodiment of the present invention, the predetermined dot number to be divided is (24×24) dots. The total digital image data 101 is divided into (3×3) pieces and includes nine divided digital image data. The total digital image data 101 includes first divided digital image data 111, second divided digital image data 112, and divided digital image data through ninth (final) divided digital image data 119.

When the division of the total digital image data 101 into (3×3) pieces is complete, the first divided digital image data 111 having (24×24) dots is read out from the memory RAMa 44 beginning at a left upper portion of the total digital image data 101 (step 205). The first divided digital image data 111 is stored in the memory RAMb 45 as external character data (step 206).

Next, the second divided digital image data 112 is read out from the memory RAMa 44 in a manner similar to the above stated step and is processed as external character data and then stored in the memory RAMb 45. This operation processing is executed repeatedly up to the ninth (final) divided digital image data 119 (step 207). The total digital image data 101 is converted into a divided digital character data assembly 120 having nine divided digital image data in the form of character data.

The divided digital character data assembly 120 is independently read out in pieces, one by one as the divided digital image data 111, 112, —and 119, in order to reproduce the total image data represented by the divided digital character data assembly 120. After the first divided digital image data 111 is read out, the position of the first divided digital image data 111 is determined. Next, the second divided digital image data 112 is read out and processed in similar fashion. In FIG. 1, such operation processing is executed repeatedly (3×3) times.

For execution of this operation processing, the stored start address and the number of the divided digital image data 111, 112, —and 119 stored in the memory RAMb 45 are stored in an index portion of the memory RAMa 44 (step 208). An index memory area of the memory RAMa 44 is maintained in advance for this purpose. By the above operation processing, the divided digital character data assembly 120, which is composed of a plurality of divided digital image data pieces up to that time, is registered as a digital character data block 130 in the memory RAMa 44.

Next, character data 140 is inputted in the memory RAMa 44 from the keyboard 1 (step 209). Keyboard 1 indicates the input position of the total digital image data 101 with respect to the document data, which is displayed on the liquid crystal display unit 2, and the data written in the index portion of the memory RAMa 44 is read out (step 210).

After the CPU 40 reads out the divided digital character data assembly 120 as written or character data, the digital character data block 130 representing the assembly of the divided digital character data can coexist with the character data 140. Therefore, a composite data structure including character and image data coexisting as editing data 150 can be provided.

According to one embodiment of the present invention, when a document with illustrations is composed by merging character data and digital image data, editing processing can be carried out at one time during operation processing.

Therefore, high speed editing processing and simplified editing operation can be attained at the same time during operation processing. Thus, an improved document editing apparatus that can be used conveniently is obtained.

We claim:

1. An image data editing apparatus for editing document data including character data and non-text image data, said image data editing apparatus comprising:
   character data input means for inputting said character data;
   main control means including control means for editing said input character data, and memory means for storing a result of the editing of said input character data;
   image data input means connected to said main control means for converting non-text image data into digital image data;
   divider means provided in said main control means for dividing said digital image data into an integral number of data sections, each of said data sections corresponding to an equal predetermined number of dots;
   conversion means provided in said main control means for converting said divided sections of digital image data into an assembly of digital character data formatted similarly as the edited input character data;
   register means provided in said main control means for storing said assembly of digital character data, as digital character data blocks, together with said input character data; and
   editing means for editing said input character data and said digital character data blocks stored in said register means in an editing operation.

2. An image data editing apparatus for editing document data including character data and non-text image data, said image data editing apparatus comprising:
   character data input means for inputting character data, main control means including control means for editing said input character data, and memory means for storing a result of the editing of said input character data and image data input means connected to said main control means for converting non-text image data into digital image data, wherein:
   said memory means of said main control means includes means for temporarily storing said digital image data, means for determining a number of divisions of said digital image data, means for dividing said digital image data into said number of divisions, means for reading out and storing each of said divided digital image data, means for converting said divided digital image data into an assembly of digital character data formatted similarly as the edited input character data, means for storing said input character data together with said assembly of digital character data, and editing means for editing said input character data and said digital character data stored in said register means in an editing operation.

3. An image data editing apparatus for editing document data including character data and non-text image data, said image data editing apparatus comprising:
   character data input means for inputting character data, main control means including control means for editing said input character data, memory means for storing a result of the editing of said input character data and image data input means connected to said main control means for converting non-text image data into digital image data, wherein:
   said memory means of said main control means includes means for temporarily storing said digital image data, means for determining a number of divisions of said digital image data, means for dividing said digital image data into said number of divisions, means for reading out and storing each of said divided digital image data, means for converting said divided digital image data into an assembly of digital character data formatted similarly as the edited input character data, index means for storing a start address of said divided digital image data in said means for reading out and storing each of said divided digital image data and a division number identifying one of said divided digital image data in an index portion of said index means, means for storing (a) said assembly of digital character data as digital character data blocks based on said start address and said division number, together with (b) said input character data, and editing means for editing said input character data and said digital character data blocks stored together in said storing means in an editing operation.

4. An image data editing apparatus for editing document data including character data and non-text image data, said image data editing apparatus comprising:
   character data input means for inputting said character data, main control means including control means for editing said input character data, memory means for storing a result of the editing of said input character data and image data input means connected to said main control means for converting said non-text image data into digital image data, wherein:
   said memory means of said main control means comprises first memory means and second memory means;
   said first memory means includes means for temporarily storing said digital image data;
   said second memory means includes means for determining a number of divisions of said digital image data, means for dividing said digital image data into said number of divisions, means for reading out and storing each of said divided digital image data, means for converting said divided digital image data into an assembly of digital character data formatted similarly as the edited input character data and means for storing said input character data together with said digital character data; and
   said first memory means further includes index means for storing a start address of said divided digital image data in said means for reading out and storing each of said divided digital image data and a division number identifying one of said divided digital image data in an index portion of said index means, means for storing (a) said assembly of digital character data as digital character data blocks based on said start address and said division number, and (b) said input character data and editing means for editing said character data and said digital character blocks stored together in said storing means in an editing operation.

5. An image data editing apparatus for editing document data including character data and non-text image data, said image data editing apparatus comprising:

character data input means for inputting said character data, main control means including control means for editing said input character data, memory means for storing a result of the editing of said input character data image data input means connected to said main control means for converting non-text image data into digital image data, display means for displaying said document data and printer means for printing said document data, wherein:

said memory means of said main control means includes means for temporarily storing said digital image data, means for determining a number of divisions of said digital image data, means for dividing said digital image data into said number of divisions, means for reading out and sorting each of said divided digital image data, means for converting said divided digital image data into an assembly of digital character data formatted similarly as the edited input character data, index means for storing a start address of said divided digital image data in said means for reading out and storing each of said divided digital image data and a division number identifying one of said divided digital image data in an index portion of said index means, means for storing (a) said assembly of digital character data as digital character data blocks based on said start address and said division number together with (b) said input character data and editing means for editing said character data together with said digital character data blocks stored together in said storing means in an editing operation.

6. An image data editing apparatus for editing document data including character data and non-text image data, said image data editing apparatus comprising:

character data input means for inputting said character data, main control means including control means for editing said input character data, memory means for storing a result of the editing of said input character data image data input means connected to said main control means for converting said non-text image data into digital image data, display means for displaying said document data and printer means for printing said document data, wherein:

said memory means of said main control means comprises first memory means and second memory means;

said first memory means includes means for temporarily storing said digital image data;

said second memory means includes means for determining a number of divisions of said digital image data, means for dividing said digital image data into said number of divisions, means for reading out and storing each of said divided digital image data, means for converting said divided digital image data into an assembly of character data formatted similarly as the edited input character data and means for storing said input character data together with said assembly of digital character data;

said first memory means further includes index means for storing a start address of said divided digital image data in said means for reading out and storing each of said divided digital image data and a division number identifying one of said divided digital image data in an index portion of said index means, and means for storing (a) said assembly of digital character data as digital character blocks based on said start address and said division number, together with (b) said input character data;

said image data input means includes means for indicating an input portion of said non-text image data within said document data; and and editing means for editing said said character data together with said digital character data blocks stored together in said storing means in an editing operation.

7. An image data editing apparatus according to claim 1, wherein each of said data sections is of a size equivalent to a standardized character size and corresponds to an equal predetermined integer number of dots.

8. An image data editing apparatus for editing document data including character data and non-text image data, said image data editing apparatus comprising:

character data input means for inputting said character data;

image data input means for converting non-text image data into digital image data;

main control means connected to said image data input means, said main control means comprising:

control means for editing said input character data, memory means for storing a result of the editing of said input character data, divider means for dividing said digital image data into an integral number of data sections, each of said data sections corresponding to an equal predetermined number of dots, conversion means for converting said divided sections of digital image data into an assembly of digital character data formatted similarly as the edited input character data, and register means for storing said assembly of character data as digital character data blocks together with said input character data; and editing means for editing said said input character data and said digital character data blocks stored together in said register means in an editing operation.

* * * * *